United States Patent
Callaway

(10) Patent No.: US 11,052,974 B2
(45) Date of Patent: Jul. 6, 2021

(54) DYNAMIC TUG WINCH CONTROL

(71) Applicant: KONGSBERG MARITIME AS, Horten (NO)

(72) Inventor: Mark Callaway, Alesund (NO)

(73) Assignee: KONGSBERG MARITIME AS, Alesund (NO)

(*) Notice: Subject to any disclaimer, the term of this patent is extended or adjusted under 35 U.S.C. 154(b) by 0 days.

(21) Appl. No.: 16/313,079

(22) PCT Filed: Jun. 28, 2017

(86) PCT No.: PCT/NO2017/050169
§ 371 (c)(1),
(2) Date: Dec. 24, 2018

(87) PCT Pub. No.: WO2018/004353
PCT Pub. Date: Jan. 4, 2018

(65) Prior Publication Data
US 2019/0315440 A1   Oct. 17, 2019

(30) Foreign Application Priority Data
Jul. 1, 2016   (NO) .................................... 20161097

(51) Int. Cl.
*B63B 21/56* (2006.01)
*B63B 35/66* (2006.01)
*B66D 1/50* (2006.01)

(52) U.S. Cl.
CPC .............. *B63B 21/56* (2013.01); *B63B 35/66* (2013.01); *B66D 1/50* (2013.01); *B66D 2700/0108* (2013.01)

(58) Field of Classification Search
CPC ......... B63B 21/56; B63B 35/66; B63B 21/66; B66D 1/50; B66D 2700/0108
See application file for complete search history.

(56) References Cited

U.S. PATENT DOCUMENTS

| | | | | |
|---|---|---|---|---|
| 2,224,503 A | * | 12/1940 | Kahlerth | .................. B66D 1/14 254/299 |
| 3,051,445 A | * | 8/1962 | Moulton | .............. B66D 1/7494 254/213 |
| 3,780,989 A | | 12/1973 | Peterson | |
| 3,801,071 A | | 4/1974 | Barron | |

(Continued)

FOREIGN PATENT DOCUMENTS

| EP | 0176189 | 4/1986 |
|---|---|---|
| GB | 1501613 | 2/1978 |

(Continued)

OTHER PUBLICATIONS

International Search Report and Written Opinion mailed in PCT/NO2017/50169 dated Sep. 27, 2017.

(Continued)

*Primary Examiner* — Stephen P Avila
(74) *Attorney, Agent, or Firm* — Wissing Miller LLP

(57) ABSTRACT

The invention relates to a tug controller and a tug for maneuvering a towed vessel, comprising a dynamic positioning system, and a tow equipment comprising a towline connected to the towed vessel, wherein the tow equipment is automatically controlled by the dynamic positioning system based on a plurality of input parameters.

24 Claims, 4 Drawing Sheets

(56) References Cited

U.S. PATENT DOCUMENTS

| | | | |
|---|---|---|---|
| 4,352,596 A | 10/1982 | Hammett | |
| 2002/0173364 A1* | 11/2002 | Boscha | A63B 69/3632 473/131 |
| 2009/0293792 A1 | 12/2009 | Alliot | |
| 2012/0059577 A1 | 3/2012 | Dunkle | |
| 2016/0314429 A1* | 10/2016 | Gillen | G06Q 10/0833 |

FOREIGN PATENT DOCUMENTS

| | | |
|---|---|---|
| GB | 2417017 | 2/2006 |
| KR | 20100122338 | 11/2010 |
| KR | 20150026411 A | 3/2015 |
| KR | 2016034642 | 3/2016 |
| RU | 2615846 C1 | 4/2017 |
| WO | 2005072309 | 8/2005 |
| WO | 20060117249 | 11/2006 |
| WO | 20160117249 | 11/2006 |

OTHER PUBLICATIONS

Norwegian Search Report mailed in 20161097 dated Jan. 28, 2017.
Extended European Search Report mailed in EP 17820608.2 dated Dec. 3, 2019.
Second Office Action dated Mar. 10, 2021 issued in corresponding Chinese Application No. CN2017800476965 with English translation (7 pages).
Supplemental Search Report dated Mar. 2, 2021 issued in corresponding Chinese Application No. CN2017800476965 with English translation (9 pages).

* cited by examiner

DYNAMIC TUG WINCH CONTROL

CROSS-REFERENCE TO RELATED APPLICATIONS

This application is a 371 of PCT/NO2017/050169 filed on Jun. 28, 2017, published on Jan. 4, 2018 under publication number WO 2018/004352A1, which claims priority benefits from Norwegian Patent Application No. 20161097 filed Jul. 1, 2016, both of which are incorporated herein in their entirety by reference.

INTRODUCTION

The present invention concerns automatic control of a tug towing equipment.

BACKGROUND

A tug, or tugboat, is a powerful boat or ship that is used for towing and pushing marine vessels. By towing and pushing the vessel, one or more tugs may maneuver the vessel during difficult maneuvering operations, such as in a harbor, in a narrow canal or during rescue operations of vessels in distress. During towing operations the tug maneuvers the vessel by pulling a towline connected between a winch on the tug and the vessel. Tugs are manually captained and the winch is manually controlled by either the captain or one of the crew. The captain receives, via radio communication, order from the towed vessel to provide thrust at a certain angle relative to the towed vessel. The captain will maneuver the tug to that location and then lock the winch and then apply thrust. The winch is manually controlled so that the towline is not let in the water or tension is not applied when it is not supposed to.

SUMMARY OF THE INVENTION

In a first aspect, the invention provides a tug for maneuvering a towed vessel, comprising a dynamic positioning system, and a tow equipment comprising a towline connected to the towed vessel, wherein the tow equipment is automatically controlled by the dynamic positioning system based on a plurality of input parameters. The plurality of parameters may include at least one of length of the towline, tension of the towline, direction of the towline, location of the towed vessel, heading of the towed vessel, speed of the towed vessel, heading of the tug, speed of the tug and relative height of a towline connector on the towed vessel to the tow equipment. The tow equipment may automatically spool in or out the towline to keep a slack of the towline and a tension of the towline within predefined thresholds. The tow equipment may further automatically adjust the direction of tow equipment such that the direction of the towline is perpendicular to the tow equipment. The dynamic positioning system may adapted to receive information of the length of the towline, the tension of the towline or the direction of the towline from the tow equipment. The tow equipment may comprise a tension sensor to measure the tension of the towline or a directional sensor to measure the direction of the towline. The dynamic positioning system may be further adapted to receive information location of the towed vessel, the heading of the towed vessel or the speed of the towed vessel from the towed vessel via wireless communication. The tug may be adapted to be put in tow mode by locking the towing equipment. The tow equipment may comprise a winch. The tow equipment may be adapted to rotate around a vertical axis relative to the tug. The dynamic positioning system may be adapted to adjust the position of the tug to keep the tow equipment within an operation range of the tow equipment. The dynamic positioning system may be adapted to determine a dangerous situation for the tug based on the plurality of input parameters, and the tow equipment may automatically spool out the towline if the dangerous situation is determined.

In a second aspect, the invention provides a tug controller, comprising a dynamic positioning system, and a tow equipment controller to control a tow equipment connected to a towed vessel by a towline, wherein the tow equipment controller is automatically controlled by the dynamic positioning system based on a plurality of input parameters. The plurality of parameters may include at least one of length of the towline, tension of the towline, direction of the towline, location of the towed vessel, heading of the towed vessel, speed of the towed vessel, heading of the tug, speed of the tug and relative height of a towline connector on the towed vessel to the tow equipment. The tow equipment controller may automatically spool in or out the towline to keep a slack of the towline and a tension of the towline within predefined thresholds. The tow equipment automatically controller may adjust the direction of tow equipment such that the direction of the towline is perpendicular to the tow equipment. The dynamic positioning system may be adapted to receive information of the length of the towline, the tension of the towline or the direction of the towline from the tow equipment controller. The tow equipment controller may receive a measure of the tension of the towline from a tension sensor in the tow equipment or a measure of the direction of the towline from a directional sensor in the tow equipment. The dynamic positioning system may be further adapted to receive information location of the towed vessel, the heading of the towed vessel or the speed of the towed vessel from the towed vessel via wireless communication. The tug controller may put the tug in tow mode by locking the towing equipment. The dynamic positioning system may be adapted to adjust the position of the tug to keep the tow equipment within an operation range of the tow equipment. The dynamic positioning system may be adapted to determine a dangerous situation for the tug based on the plurality of input parameters, and the tow equipment may automatically spool out the towline if the dangerous situation is determined.

BRIEF DESCRIPTION OF DRAWINGS

Embodiments of the invention will now be described with reference to the followings drawings, where.

DETAILED DESCRIPTION

Figure 1A:
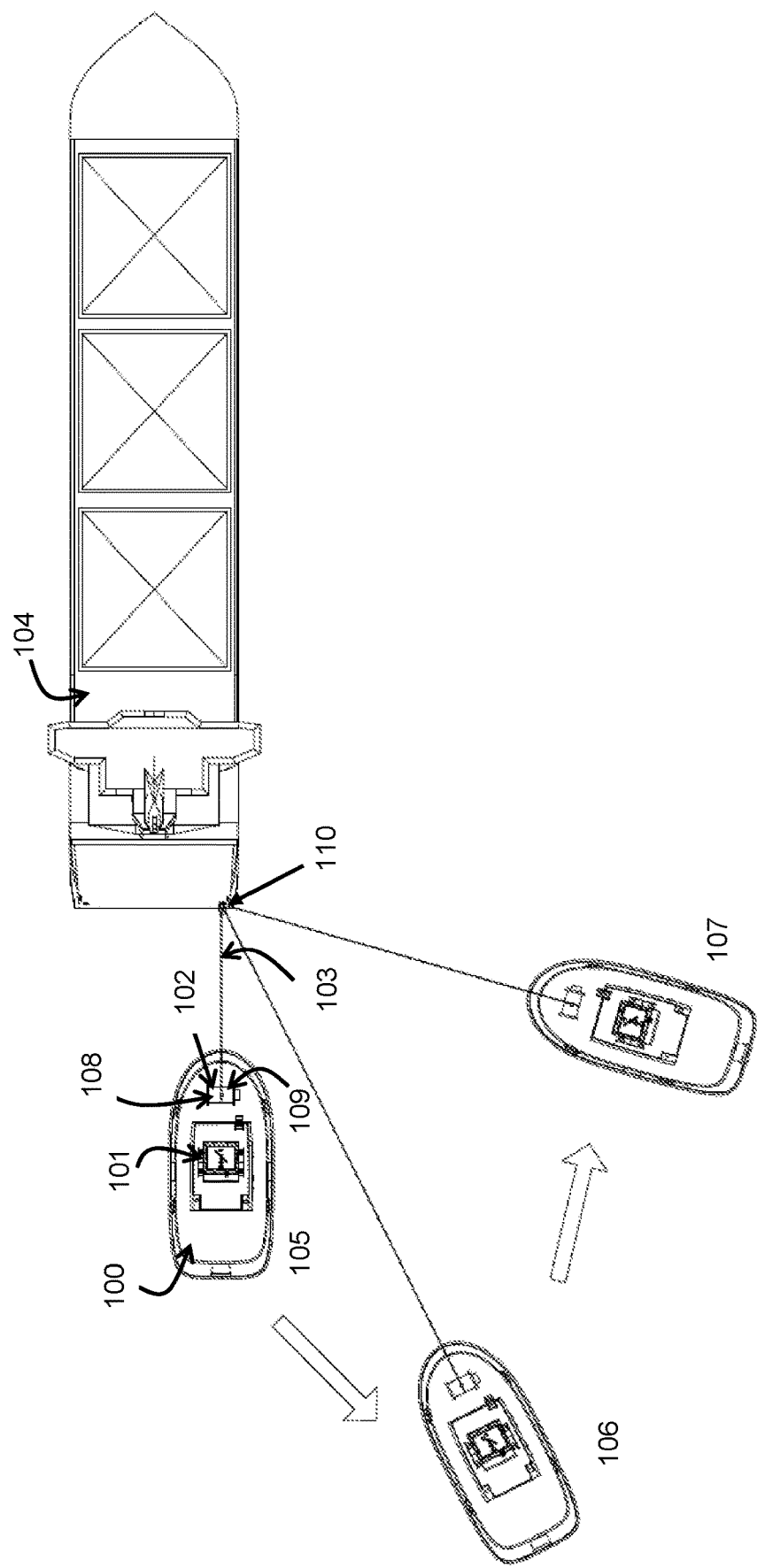
FIG. 1a shows a top perspective view of a tug changing position.

The present invention will be described with reference to the drawings. The same reference numerals are used for the same or similar features in all the drawings and throughout the description.

Tug

Figure 1B:
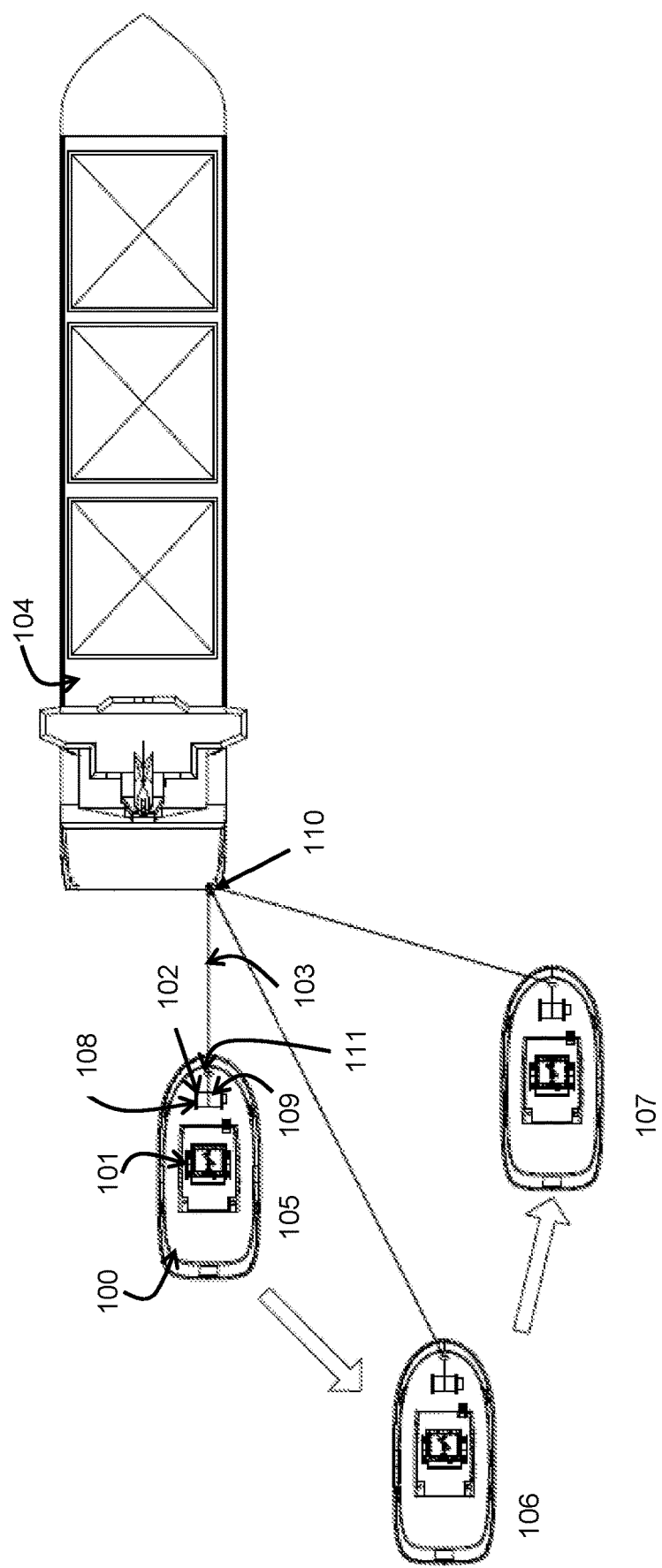
FIG. 1b shows a top perspective view of a tug changing position.
Figure 1C:
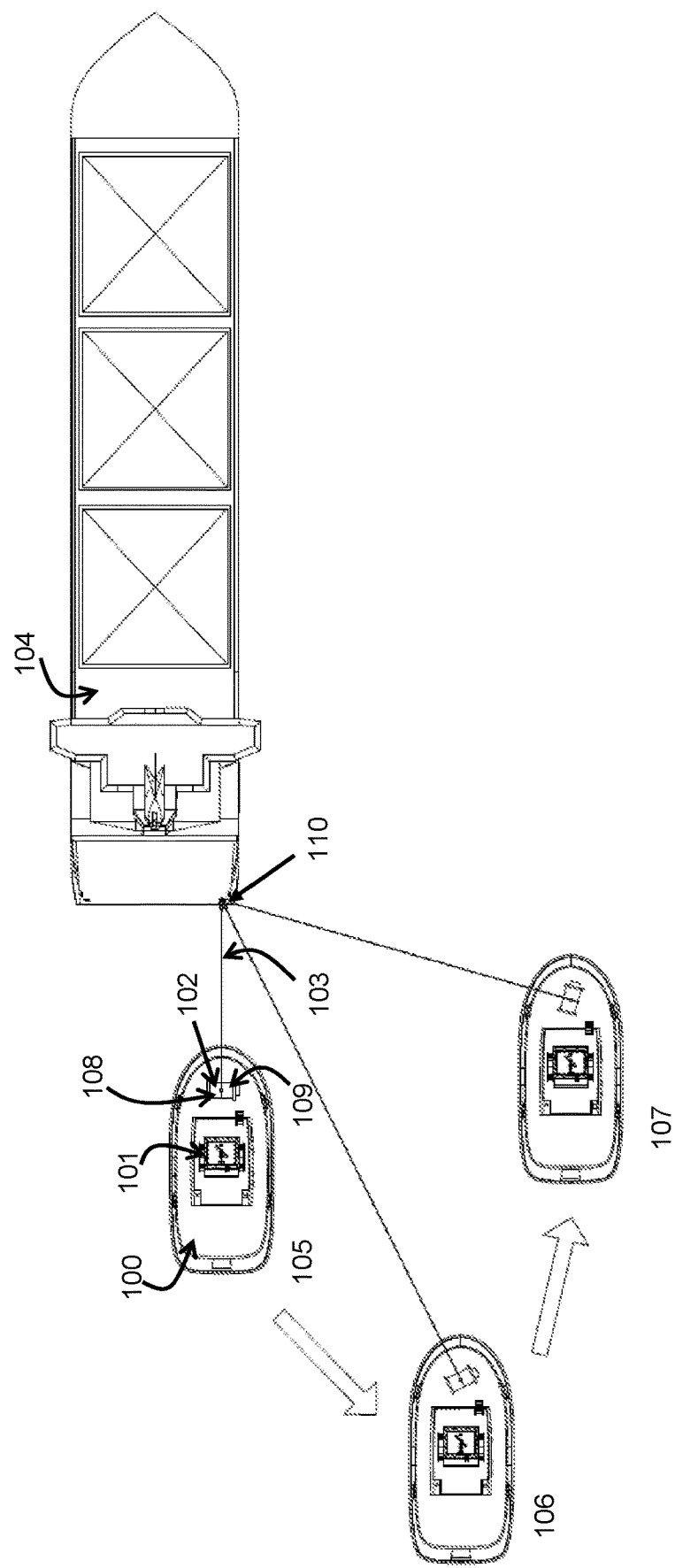
FIG. 1c shows a top perspective view of a tug changing position.

FIG. 1a, FIG. 1b and FIG. 1c shows a perspective view of a tug 100 connected to a towed vessel 104 by a tow equipment 102 comprising a towline 103. The towline 103 is on the towed vessel end connected to the towed vessel 104 by a towline connector 110, such as a bollard. The tow equipment 102 comprises a spooling device, such as a winch, to spool in and out the towline 103. FIG. 1a and FIG. 1b show a tow equipment 102 in a fixed position on the tug 100. The fixed tow equipment 102 may also comprise a towing point device 111 that can guide the towline 103 from the spooling device to the towed vessel 104. The towing point device 111 may be a rotating element or a fairlead as illustrated in FIG. 1b. The fairlead 111 in the bow of the tug 100 allows the transverse force of the towline 103 to be transmitted to the hull of the towed vessel 104. Alternatively, as illustrated in FIG. 1c, the tow equipment 102 may be adapted to rotate around a vertical axis relative to the tug 100. The tug 100 comprises a dynamic positioning (DP) system 101. The tow equipment 102 is connected to the DP-system 101. The tow equipment 102 is automatically controlled by the dynamic positioning system 103 based on a plurality of input parameters. The plurality of input parameters comprises at least one of a length of the towline 103, a tension of the towline 103, a direction of the towline 103, a location of the towed vessel 104, a heading of the towed vessel 104, a speed of the towed vessel 104, a heading of the tug 100, a speed of the tug 100 and a relative height of the towline connector 110 on the towed vessel 104 to the tow equipment 102. This allows continuous adjustment of the tow equipment 102, such that when the tug 100 is in position to tow, the tug 100 may be put in tow mode by locking the towing equipment 102. The continuous adjustment of the tow equipment 102 may also continue while the tug 100 tows the towed vessel 104.

As illustrated in FIG. 1a, FIG. 1b and FIG. 1c, the tug 100 is about to change position from a first position 105 to a second position 106. When moving position, the tug 100 should not apply undue tension to the vessel 104, nor should the towline 103 be allowed to drop in the water. A threshold of the amount of allowed slack of the towline 103 and a threshold on the amount of allowed tension of the towline 103 may be defined. In example, a large towed vessel would not be as impacted by the tension of a long towline than a smaller vessel, and would have different threshold on slack and tension than the smaller vessel. The tow equipment 102 may automatically spool in or out the towline 103 to keep the slack of the towline and the tension of the towline within the predefined thresholds. The dynamic positioning system 101 may be adapted to receive information of the length of the towline, the tension of the towline or the direction of the towline from the tow equipment 102, e.g. by wired or wireless communication. A spool of the tow equipment 102 may, for example, keep record of the length of spooled out towline 103. The dynamic positioning system 101 may also receive information about the relative height of the towline connector 110 on the towed vessel 104 to the tow equipment 102. The relative height of the towline connector 110 is a static parameter that relates to the current displacement of both the tug 100 and the towed vessel 104, the position of the tow equipment 102 on the tug 100 and the position of the towline connector 110 on the towed vessel 104. This parameter may be input to dynamic positioning system 101 manually, or by means of a height measurement device. The tow equipment 102 may further comprise a tension sensor 108 to measure the tension of the towline 103, or a directional sensor 109 to measure the direction of the towline 103. When the tug 100 changes position, e.g. from the first position 105 to the second position 106, the direction of the towline 103 with respect to the tow equipment 102 and the tug 100 may change. As illustrated in FIG. 1c, the tow equipment 102 may automatically adjusts the direction of tow equipment 102 such that the direction of the towline 103 is perpendicular to the towed vessel 104. In this manner, the towline 103 may be kept in optimal position for tow operation. FIG. 1a and FIG. 1b illustrates alternative embodiments where the tow equipment 102 is in a fixed position relative to the tug 100. The dynamic positioning system 101 may then adjust the position of the tug 100 relative to the towed vessel 104. In this manner, the towline 103 may be kept within angular limits of the fixed spooling device and in optimal position for tow operation. Also, in the case the tow equipment 102 is at an outer limit of an operation range of the direction adjustment such that no further adjustment is possible, the dynamic positioning system 101 may adjust the position of the tug 100 relative to the towed vessel 105. In this manner, the towline 103 may be kept in optimal position for tow operation.

As discussed above, when moving position, the tug 100 should not apply undue tension to the vessel 104, nor should the towline 103 be allowed to drop in the water. This is of course also the case when the tug 100 is stationary and the vessel 104 moves relative to the tug, or both the tug and vessel moves relative to one another. Further, a threshold of the amount of allowed slack of the towline 103 and a threshold on the amount of allowed tension of the towline 103 was defined. The tow equipment 102 may automatically spool in or out the towline 103 to keep the slack of the towline and the tension of the towline within the predefined thresholds. The dynamic positioning system 101 may be adapted to receive information of information location of the towed vessel, the heading of the towed vessel or the speed of the towed vessel from the towed vessel 104 via wireless communication. The dynamic position system 101 may further, based on the information of the location of the towed vessel, the heading of the towed vessel and the speed of the towed vessel, determine whether it would be necessary for the tow equipment 102 to automatically spool in or out the towline 103 to keep the slack of the towline and the tension of the towline within the predefined thresholds, or automatically adjust the direction of the tow equipment 102 such that the direction of the towline 103 is perpendicular to the towed vessel 104. The dynamic positioning system 101 may also determine to adjust the position of the tug 100 relative to the towed vessel 104 such that the tow equipment 102 is kept within the operation range of the direction adjustment. Additionally, the dynamic positioning system 101 may also determine to adjust the position of the tug 100 relative to the towed vessel 104 such that, for a fixed spooling device, the towline 103 is within the angular limits of the fixed spooling device.

Now returning to FIG. 1a, FIG. 1b and FIG. 1c. When the tug 100 moves from the first position 105 to the second position 106, this could be caused by the tug 100 moving, the towed vessel 104 moving or both the tug and the towed vessel moving. The dynamic positioning system 101 may, based on the length of the towline, the tension of the towline, the direction of the towline, the location of the towed vessel, the heading of the towed vessel, the speed of the towed vessel, the speed of the tug, the heading of the tug and the relative height of a towline connector on the towed vessel to the tow equipment, instruct the tow equipment 102 to adjust accordingly. In this case spool out the towline 103 and adjust the direction of the tow equipment 102. Similarly, when the tug 100 moves from the second position 106 to the third position 107, the tow equipment 102 would have to spool in the towline 103 and further adjust the direction of the tow equipment 102 and/or change the position of the tug 100.

The tug 100 and the towed vessel 104 may also move relative relative to one another while the tug 100 manoeuvres the towed vessel 104 by pulling on the towline 103. In this case, the dynamic position system 101 may continue to instruct the tow equipment 102 to adjust according to the input parameters as described in further detail above. The main difference being that the dynamic positioning system 101 allows a tension of the towline 13 that is sufficient to pull the towed vessel 104.

The dynamic positioning system 101 may, based on the plurality of input parameters determine that at dangerous situation for the tug 100 is occurring, or is about to occur. The dangerous situation may occur if the to the angle of the towline, the tension of the towline and/or the heel of the tug is dangerous for the tug itself. If the dynamic positioning system 101 determines that a dangerous situation has occurred, or is about to occur, the tow equipment automatically spools out the towline.

Tug Controller

Figure 2:
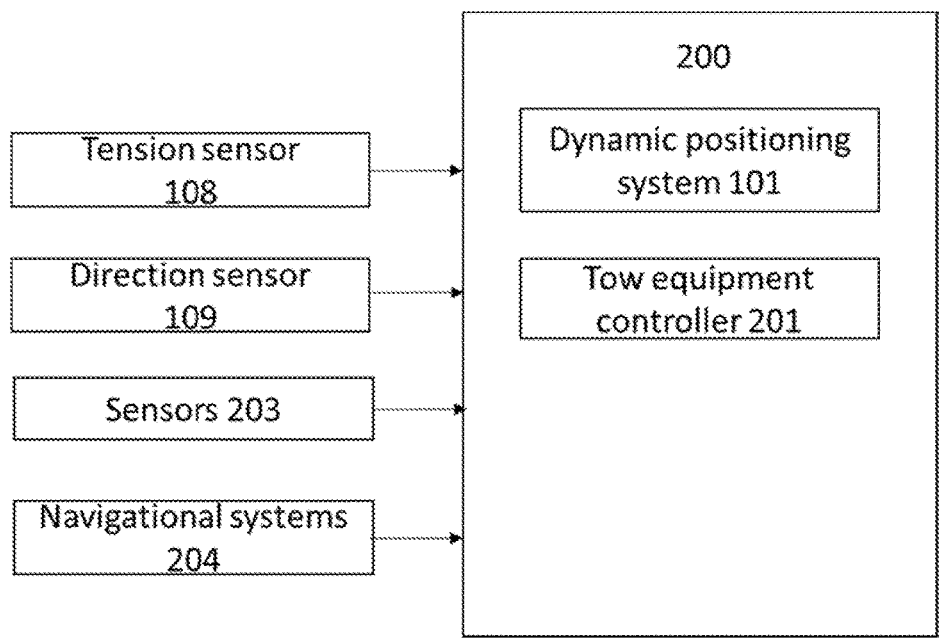
FIG. 2 illustrates an exemplary tug controller.

The tug 100 is provided with a tug controller 200 as illustrated in FIG. 2. The tug controller 200 comprises a dynamic positioning system (DP) system 101 and a tow equipment controller 201. The DP-system 101 is a computer-controlled system to automatically maintain the tug's 100 position and heading by using its own propellers and thruster. The DP-system 101 may work in unison with steering input from the captain of the tug 100, such that the captain can cede the control of the propellers and thrusters to the DP-system 101, while the captain focuses on the maneuvering, surface traffic etc. In this manner is the control of the propellers and thrusters carried out semi-autonomously by the DP-system 101. Alternatively, the captain may provide predetermined instructions to the DP-system 101, which autonomously carries out the control of the propellers and thrusters.

The DP-system 101 is connected to the tow equipment controller 201. The tow equipment controller 201 is automatically controlled by the dynamic positioning system 101 based on a plurality of input parameters. The plurality of input parameters comprises at least one of a length of the towline, a tension of the towline, a direction of the towline, a location of the towed vessel, a heading of the towed vessel, a speed of the towed vessel, a heading of the tug, a speed of the tug and a relative height of a towline connector on the towed vessel to the tow equipment. The DP-system 101 may receive the data of the tension of the towline or the direction of the towline from the tow equipment controller, e.g. by wired or wireless communication. The tow equipment controller 201 may further receive measure of the tension of the towline from the tension sensor 108 in the tow equipment 102, or a measure of the direction of the towline from the directional sensor 109 in the tow equipment 102. The tow equipment 102 may relay the measure of the tension and the direction to the dynamic positioning system 101. The relative height of the towline connector may be input to dynamic positioning system manually 101, or by means of a height measurement device. The dynamic positioning system 101 may further receive information location of the towed vessel, the heading of the towed vessel or the speed of the towed vessel from the towed vessel via wireless communication. The DP-system 101 also comprises information about the speed and heading of the tug 100 itself. The dynamic position system 101 may further, based on the information of the length of the towline, the tension of the towline, the direction of the towline, the location of the towed vessel, the heading of the towed vessel, the speed of the towed vessel, the heading of the tug, the speed of the tug and the relative height of the towline connector on the towed vessel to the tow equipment, determine whether it would be necessary for the tow equipment controller 201 to automatically spool in or out the towline 103 to keep the slack of the towline and the tension of the towline within the predefined thresholds, or automatically adjust the direction of the tow equipment 102 such that the direction of the towline 103 is perpendicular to the towed vessel 104. The dynamic positioning system 101 may also adjust the position of the tug 100 relative to the towed vessel 104 when the tow equipment 102 is at an outer operation range of the direction adjustment, such that the tow equipment 102 is within operation range of the direction adjustment. Additionally, the dynamic positioning system 101, in the case of a fixed spooling device, may adjust the position of the tug 100 relative to the towed vessel 104 such that the towline 103 is within the angular limits of the fixed spooling device. Further, the tug controller 200 may put the tug 100 in tow mode by locking the towing equipment 102. The tug controller may further continue to adjust the tow equipment 102 while the tug 100 tows the towed vessel 104. The dynamic positioning system 101 may, based on the plurality of input parameters determine that at dangerous situation for the tug 100 is occurring, or is about to occur. When the dynamic positioning system 101 determines that a dangerous situation has occurred, or is about to occur, the tow equipment controller 201 automatically spools out the towline 103.

The tug 100 is acted on by wind, waves and sea current. In addition, the tug 100 often operates under difficult maneuvering operations, such as in a harbor or in a narrow canal, where the tug 100 may face other hazards such as other surface traffic, land, rocks and other fixed hazards. DP-system 101 may therefore receive additional input parameters from sensors 203 and navigational systems 204. Based on the plurality of input parameters the DP control system 101 is controlling the position, heading and amount of thrust of the tug 100. The DP control system 101 determines when, where and how the tug 100 should be moved. When the DP control system 101 determines that the tug 100 should move, the DP control system 101 outputs movement instructions including speed and direction to a propulsion control unit.

Figure 3:
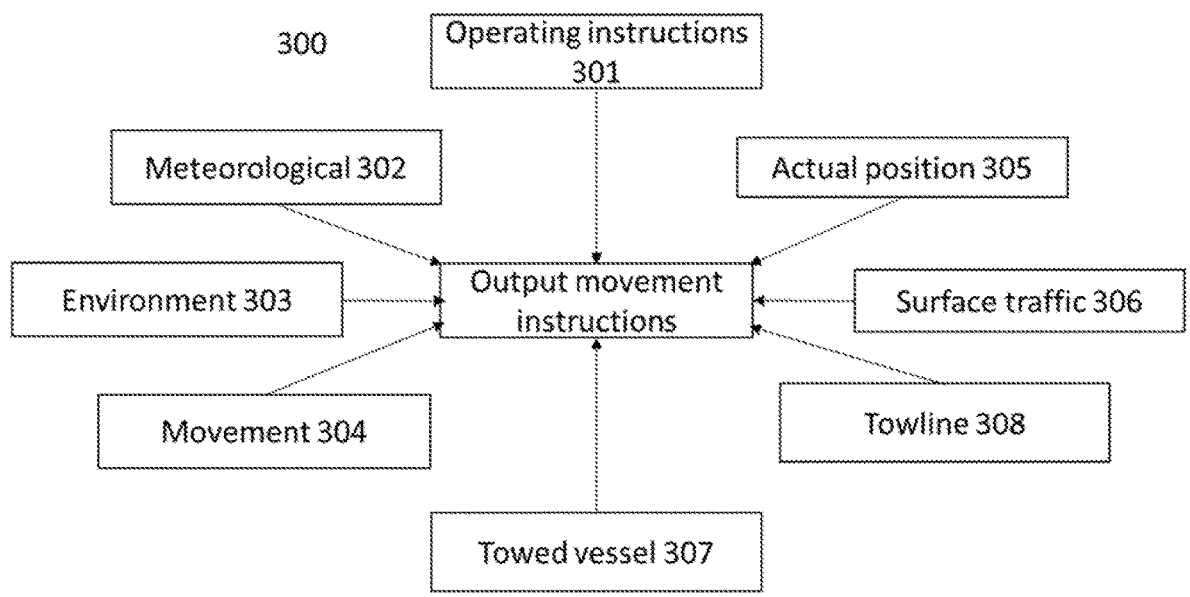
FIG. 3 illustrates an exemplary dynamic positioning control system.

FIG. 3 illustrates an exemplary arrangement 300 for the dynamic positioning control system 101. The DP control system checks current operating instructions 301. The DP control system 300 may check parameters relating meteorological input parameters 302, environmental input parameters 303, movement of the tug 304, towline related parameters 308 and towed vessel related parameters 307. If the tug 100 has drifted away, or is likely to drift away, from the vessel 104, or the position of the tug 100 relative to the vessel 104 has changed, the DP control system 101 outputs movement instructions to counteract the drift or change in position. The DP control system 300 may also check parameters relating to the actual position of the tug 100 relative to land, rocks and other fixed hazards 305. If the DP control system 300 determines that the tug 100 or vessel 104 is too close to any fixed hazards, the DP control system 101 outputs movement instructions to move the tug 100 and vessel 104 safely away from the fixed hazards. The DP control system 300 may also check parameters relating to the position of the vessel 104 relative to other surface traffic 306, evaluates the surface traffic parameters in view of relevant navigational rules. If the DP control system 300 determines that the tug 100 or vessel 104 should move away from other surface traffic, the DP control system 101 outputs movement instructions to move the tug 100 and vessel 104 accordingly.

Wind, waves and sea currents acting on the tug 100 or vessel 104 causes the tug or vessel to move from the desired location or path, thus also changing the parameters relating to the towline 103 and the tow operation. The DP control system 101 may calculate the movement from the desired location or path, e.g. the drift, based on meteorological parameters and environmental input parameters such as wind direction, wind strength, water temperature, air temperature, barometric pressure, wave height etc. The input parameters are provided by relevant sensors connected to DP control system 101 such as a wind meter, thermometer, barometer etc. When the DP-control system 101 has calculated the drift, the system output movement instructions to counteract the drift. Other input parameters to calculate the drift may include data from movement sensors such as a gyro, an accelerometer, a gyrocompass and a turn-rate indicator.

Movement of the tug 100 or vessel 104 may also be calculated from actual position parameters of the tug or vessel relative to the desired location. The actual position parameters may be obtained from navigation systems connected to the DP control system 101. The navigation system may be a ground based radio navigation system, such as DECCA, LORAN, GEE and Omega, or a satellite navigation systems, such as GPS, GLONASS, Galileo and BeiDou. In the case of satellite navigation systems, the accuracy of the actual location may be improved by input to the CP control system from a Differential Global Positioning System (DGPS).

The DP-control system 101 may also receive input parameters from electronic navigational charts. Combined with input parameters from the navigation systems, this allows the DP control system 101 to determine movement instructions that safely controls the tug 100 and vessel 104 from colliding with land, rocks and other fixed hazards. For this purpose, the DP-control system may also receive input parameters from other sensors such as a sonar, marine radar, and/or an optical system using a camera. The sonar may provide information about underwater hazards such as land, rocks, underwater vessel etc. The marine radar and/or optical system may provide information about overwater hazards such as land and other surface vessels. The marine radar and/or optical system may also provide navigation information from sea marks such as beacons, buoys, racons, cairns and lighthouses.

The tug 100 may have to comply with navigational rules for preventing collision with other ships or vessels. A database comprising the relevant navigational rules for an operation location of the tug may be included in the DP control system 101. In one embodiment, the DP control system 101 receives input parameters relating to other surface traffic, evaluates the surface traffic parameters in view of the relevant navigational rules, when determining when and where the tug 100 should be moved. The input parameters relating to surface traffic may be provided by sensors and systems connected to the vessel controller unit such as a marine radar, an Automatic Identification System (AIS) and an automatic radar plotting aid (ARPA). In one embodiment, the input parameters relating to surface traffic may be provided by optical sensors such as a camera. The optical sensors may observe and recognize other surface vessels and provide navigation information from sea marks such as beacons, buoys, cairns and lighthouses.

The tug controller 200, the dynamic positioning control system 101 and the propulsion control unit may be implemented in a computer having at least one processor and at least one memory. An operating system runs on the at least one processor. Custom programs, controlled by the system, are moved into and out of memory. These programs include at least the tug controller 200, the dynamic positioning control system 101 and the propulsion control unit as described above. The system may further contain a removable memory component for transferring images, maps, instructions or programs.

Having described preferred embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. A tug for maneuvering a towed vessel, the tug comprising:
at least one thrust generating device;
a tow equipment comprising a towline connectable to the tow vessel; and
a dynamic positioning system adapted to maintaining a position and a heading of the tug by controlling the at least one thrust generating device, wherein the dynamic positioning system is adapted to receive information from the tow equipment;
wherein the tow equipment is automatically controlled by the dynamic positioning system based on a plurality of input parameters.

2. Tug according to claim 1, wherein the plurality of parameters includes at least one of:
length of the towline;
tension of the towline;
direction of the towline;
location of the towed vessel;
heading of the towed vessel;
speed of the towed vessel;
heading of the tug;
speed of the tug; and
relative height of a towline connector on the towed vessel to the tow equipment.

3. Tug according to claim 1, wherein the tow equipment automatically spools in or out the towline to keep a slack of the towline and a tension of the towline within predefined thresholds.

4. Tug according to claim 1, wherein the tow equipment automatically adjusts a direction of the tow equipment such that a direction of the towline is perpendicular to the tow equipment.

5. Tug according to claim 1, wherein the dynamic positioning system is adapted to receive information of a length of the towline, a tension of the towline or a direction of the towline from the tow equipment.

6. Tug according to claim 1, wherein the tow equipment comprises a tension sensor to measure the tension of the towline.

7. Tug according to claim 1, wherein the tow equipment comprises a directional sensor to measure the direction of the towline.

8. Tug according to claim 1, wherein the dynamic positioning system is adapted to receive information of a location of the towed vessel, heading of the towed vessel or speed of the towed vessel from the towed vessel via wireless communication.

9. Tug according to claim 1, wherein the tug is adapted to be put in a tow mode by locking the towing equipment.

10. Tug according to claim 1, wherein the tow equipment comprises a winch.

11. Tug according to claim 1, wherein the tow equipment is adapted to rotate around a vertical axis relative to the tug.

12. Tug according to claim 1, wherein the dynamic positioning system is adapted to adjust a position of the tug to maintain the tow equipment within an operation range of the tow equipment.

13. Tug according to claim 1, wherein the dynamic positioning system is adapted to determine a dangerous situation for the tug based on the plurality of input parameters, and the tow equipment automatically spools out the towline if the dangerous situation is determined.

14. Tug controller, comprising:
a tow equipment controller to control a tow equipment of a tug, where the tow equipment is connectable to a towed vessel by a towline; and
a dynamic positioning system adapted to maintaining a position and a heading of the tug by controlling at least one thrust generating device of the tug, wherein the dynamic positioning system is adapted to receive information from the tow equipment;
wherein the tow equipment controller is automatically controlled by the dynamic positioning system based on a plurality of input parameters.

15. Tug controller according to claim 14, wherein the plurality of parameters includes at least one of:
length of the towline;
tension of the towline;
direction of the towline;
location of the towed vessel;
heading of the towed vessel;
speed of the towed vessel;
heading of the tug;
speed of the tug; and
relative height of a towline connector on the towed vessel to the tow equipment.

16. Tug controller according to claim 14, wherein the tow equipment controller automatically spools in or out the towline to keep a slack of the towline and a tension of the towline within predefined thresholds.

17. Tug controller according to claim 14, wherein the tow equipment controller automatically adjusts a direction of the tow equipment such that a direction of the towline is perpendicular to the tow equipment.

18. Tug controller according to claim 14, wherein the dynamic positioning system is adapted to receive information of a length of the towline, a tension of the towline or a direction of the towline from the tow equipment controller.

19. Tug controller according to claim 14, wherein the tow equipment controller receives a measure of tension of the towline from a tension sensor in the tow equipment.

20. Tug controller according to claim 14, wherein the tow equipment controller receives a measure of direction of the towline from a directional sensor in the tow equipment.

21. Tug controller according to claim 14, wherein the dynamic positioning system is adapted to receive information of a location of the towed vessel, heading of the towed vessel or speed of the towed vessel from the towed vessel via wireless communication.

22. Tug controller according to claim 14, wherein the tug controller is adapted to put the tug in tow mode by locking the towing equipment.

23. Tug controller according to claim 14, wherein the dynamic positioning system is adapted to adjust a position of the tug to maintain the tow equipment within an operation range of the tow equipment.

24. Tug controller according to claim 14, wherein the dynamic positioning system is adapted to determine a dangerous situation for the tug based on the plurality of input parameters, and the tow equipment controller automatically spools out the towline if the dangerous situation is determined.

* * * * *